United States Patent [19]

Gordon et al.

[11] 4,304,501
[45] Dec. 8, 1981

[54] DISCONNECT GEAR COUPLING

[75] Inventors: William J. Gordon; Bernard L. Rappel, both of Milwaukee, Wis.

[73] Assignee: The Falk Corporation, Milwaukee, Wis.

[21] Appl. No.: 80,335

[22] Filed: Oct. 1, 1979

[51] Int. Cl.³ .............................................. F16D 3/18
[52] U.S. Cl. ..................................... 403/359; 64/9 R
[58] Field of Search ................... 403/359; 64/9 R, 9 A

[56] References Cited

U.S. PATENT DOCUMENTS

| | | | |
|---|---|---|---|
| 1,683,999 | 9/1928 | Sykes | 64/9 A |
| 1,864,090 | 6/1932 | Müller | 64/9 R |
| 3,303,668 | 2/1967 | Winkler | 64/9 R |

FOREIGN PATENT DOCUMENTS

| | | | |
|---|---|---|---|
| 2105135 | 5/1972 | Fed. Rep. of Germany | 64/9 R |
| 2263090 | 7/1973 | Fed. Rep. of Germany | 403/359 |
| 914665 | 6/1946 | France | 64/9 R |
| 918252 | 2/1963 | United Kingdom | 64/9 R |
| 257944 | 11/1969 | U.S.S.R. | 403/359 |

*Primary Examiner*—James Kee Chi
*Attorney, Agent, or Firm*—Quarles & Brady

[57] ABSTRACT

A disconnect gear coupling as an internally toothed sleeve which connects external teeth formed on a pair of hubs adapted to be mounted on driving and driven shafts. A travel screw is threadedly received in a bore in a flange of the sleeve and extends axially with its outer end journaled and held against rotation in a bore in a support bracket. The support bracket extends radially from the end of one of the hubs. The sleeve is shifted axially to disengage with the teeth of the other hub by rotating the travel screw.

6 Claims, 2 Drawing Figures

DISCONNECT GEAR COUPLING

BACKGROUND OF THE INVENTION

This invention relates to gear couplings and particularly to a gear coupling having an integrally mounted mechanism for disconnecting the coupling halves.

Gear couplings are common devices for joining a driving shaft and a driven shaft. In their simplest form, the couplings include a pair of hubs, one of which is attached to each of the shafts, with each of the hubs having a series of external gear teeth, usually crowned. The two hubs are joined by a coupling sleeve which has a series of internal gear teeth which mate with the teeth of the hubs.

There are instances of use of gear couplings when it is desirable to disconnect the two shafts without disassembling and removing the coupling. This has typically been accomplished by providing devices for shifting the coupling sleeve so that it disengages the teeth of one of the hubs. The present devices for accomplishing that shifting use a lever mechanism which engages the sleeve. The lever mechanism typically has its fulcrum or pivot mounted remote from the coupling. By moving the lever, either manually or with power assist, the sleeve is caused to be shifted from engagement with one of the hubs.

The disadvantage of such an arrangement is that it requires a means for mounting the shifting mechanism in the vicinity of but separate from the coupling. This increases both the complexity of the installation and the space required for the installation.

A disconnect coupling in accordance with our invention provides a mechanism for shifting a coupling sleeve to disconnect the gear coupling, which mechanism is incorporated in and mounted wholly upon the gear coupling.

SUMMARY OF THE INVENTION

In accordance with our invention we provide a disconnect coupling having a pair of hubs each with a series of external gear teeth, a sleeve having a series of internal gear teeth adapted to mesh with the external teeth of the two hubs, and a threaded member extending axially between the sleeve and one of the hubs, the threaded member being axially restrained in either the sleeve on the one hub and being threadedly received in the other, whereby rotation of said threaded member will cause shifting of the sleeve axially of the coupling.

The invention may also reside in such a disconnect coupling in which the hub mounting the support is provided with a circumferential surface which can support the inner diameter of the internal gear teeth of the sleeve when the sleeve has been shifted.

It is a principal object of this invention to provide a gear coupling which includes a disconnect mechanism that is mounted wholly upon the coupling elements.

It is a further object of the invention to provide a simple but effective mechanism for accomplishing the shifting of the sleeve of a gear coupling to disconnect the coupling.

The foregoing and other objects and advantages of the invention will appear in the description which follows. In the description, reference is made to the accompanying drawing which illustrates a preferred embodiment of the invention.

DETAILED DESCRIPTION OF THE PREFERRED EMBODIMENT

Figure 1:
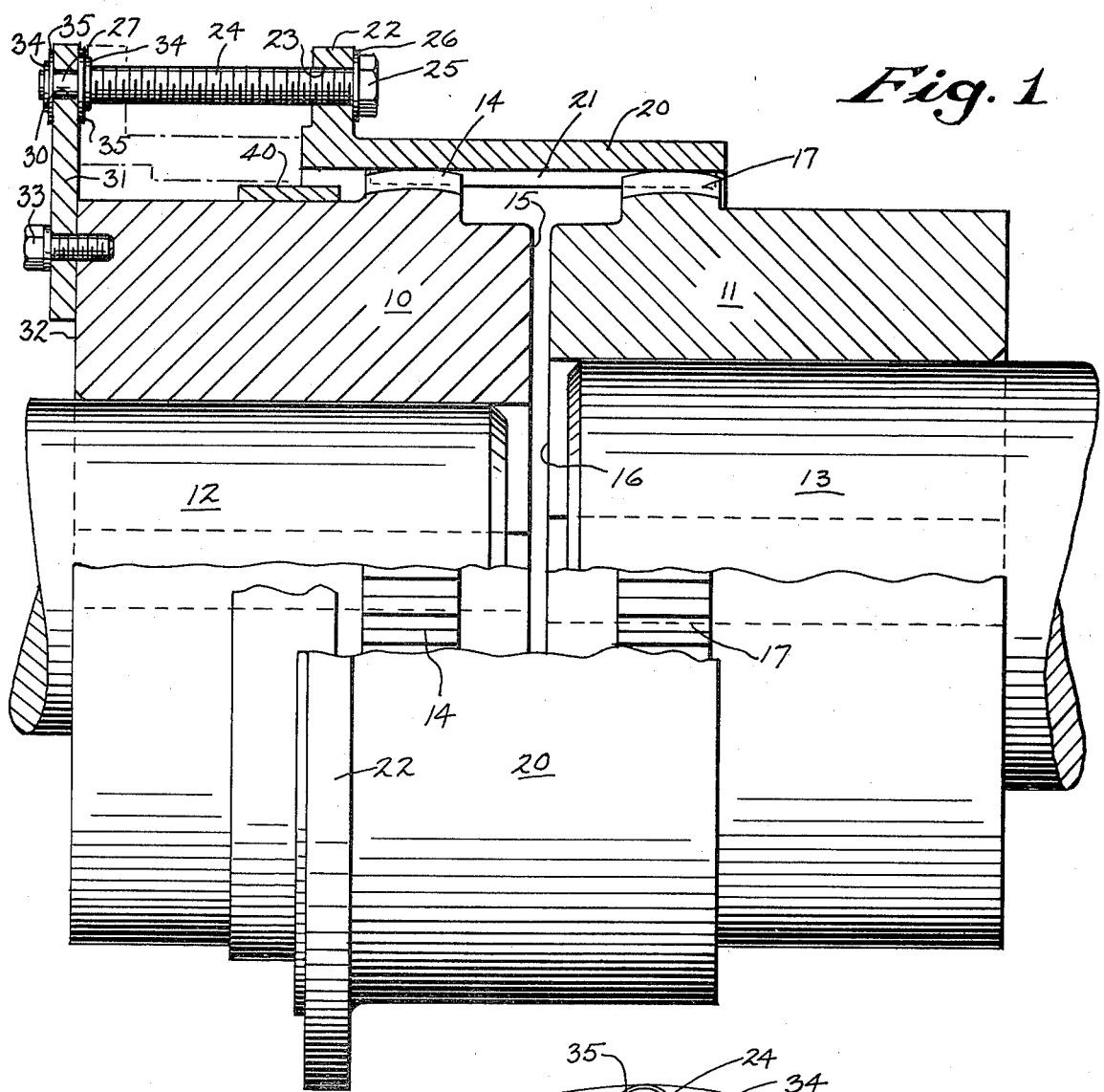
FIG. 1 is a view in side elevation, and partially in section, of a coupling in accordance with this invention.
Figure 2:
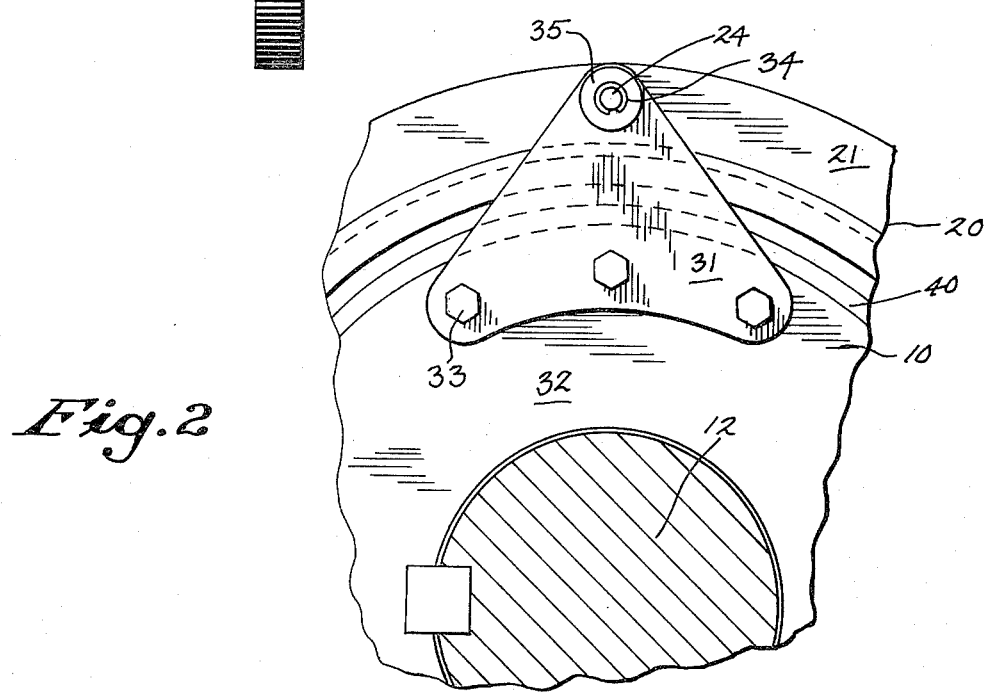
FIG. 2 is a partial end view in elevation illustrating the support for the travel screw of the disconnect mechanism.

The disconnect coupling in accordance with this invention includes a pair of hub members 10 and 11 which are adapted to be mounted upon and keyed to the ends of respective driving and driven shafts 12 and 13. The hub 10 on the driving shaft 12 is formed with a series of gear teeth 14 on a circumferential extension at a position spaced outwardly from the inner face 15 of the hub 10 which opposes the similar inner face 16 of the opposite hub 11. The hub 11 is provided with an identical series of gear teeth 17. The teeth 14 and 17 are each preferably provided with an axially crowned tip, as is well known in the art.

A coupling sleeve 20 is provided with a series of internal gear teeth 21 which are adapted to mesh with the teeth 14 and 17 of the hubs 10 and 11, respectively. When the sleeve 20 is in the solid line position shown in FIG. 1, the sleeve engages both series of teeth 14 and 17 and physically connects the two hubs 10 and 11 to transmit torque between the shafts 12 and 13. The internal teeth 21 will mesh with the external teeth 14 and 17 in a sliding fit so that the sleeve 20 is capable of being axially moved with respect to the hubs.

The sleeve 20 is provided with an upstanding flange 22 at one edge and the flange 22 has a threaded bore 23 extending parallel to the axis of the coupling. A travel screw 24 is threadedly received in the threaded bore 23 of the flange 22 and includes a head 25 which bears against a washer 26 which in turn bears against a surface of the flange 22. The outer end 27 of the travel screw 24 is devoid of threads and is journaled in a bore 30 formed adjacent the apex of a generally triangular-shaped support bracket 31. The support bracket 31 is attached to the outer face 32 of the hub 10 by machine screws 33. The smooth unthreaded end 27 of the travel screw 24 is axially restrained within the support 31 by a pair of snap rings 34 which engage recesses in the travel screw and which bear against washers 35 on either side of the support 31. A circular cylindrical guide ring 40 surrounds the hub 10 at a position between the series of teeth 14 of the hub 10 and the support 31.

Disconnecting the two coupling halves represented by the hubs 10 and 11 is simply accomplished by rotating the travel screw 24. Since the outer end 27 of the travel screw 24 is captured in the support 31, rotation of the travel screw will cause the threaded bore 23 of the sleeve 20 to move axially along the screw 24 and thereby will axially displace the sleeve 20. As the sleeve 20 is shifted axially, the inner diameter of the internal gears 21 will slide over and be supported by the outer surface of the guide ring 40 so that when the sleeve 20 has been fully axially removed from meshing engagement with the external teeth 17 of the hub 11, the sleeve 20 will continue to be supported over a substantial portion of its length and will not have a tendency to become axially misaligned. Once the sleeve 20 is totally disconnected from engagement with the gear teeth 17 of the hub 11, there is no longer a physical connection between the two shafts and the coupling has been functionally disconnected. Rotation of the travel screw 24 in an opposite direction will move the sleeve 20 into reengagement with the teeth 17 of the hub 11.

Although the preferred embodiment employs the support bracket 31 as the anchor point for the travel screw 24, a similar result can be achieved by anchoring the screw 24 in the sleeve 20 and providing a threaded bore in the support 31. Also, the outer surface for supporting the inner diameter of the teeth 21 of the sleeve 20 can be formed integral with the hub 10 rather than by a separate ring 40.

As will be appreciated, the disclosed coupling provides the disconnect function with a simple mechanism utilizing few additional parts. The outer envelope for the coupling is increased only slightly over that for a coupling without the disconnect feature and no supports or attachments are required to be provided in the vicinity of the coupling.

We claim:

1. A disconnect coupling, comprising:
   a pair of hubs having identical series of external teeth;
   a sleeve having a series of internal teeth adapted to mesh with the external teeth of the two hubs to join the same;
   an elongated threaded member extending parallel to the axis of the hubs between said sleeve and one of said hubs;
   a support which is stationary with respect to said one hub; and
   said threaded member being threadedly received in one of said sleeve and said support and being journaled in and axially restrained in the other of said sleeve and said support whereby rotation of the threaded member will cause axial displacement of said sleeve between one position in which the sleeve is engaged with both hubs and a second position in which the sleeve is disengaged from the other of said hubs.

2. A disconnect coupling in accordance with claim 1 therein said one hub is provided with a circumferential surface portion adapted to support the inner diameter of the internal teeth of said sleeve when said sleeve is axially displaced to said second position.

3. A disconnect coupling for joining driving and driven shafts, comprising:
   a pair of hubs having identical series of external gear teeth and each adapted for mounting on one of said shafts;
   a sleeve having a series of internal gear teeth adapted to mesh with the external teeth of the two hubs and to bridge the gap therebetween;
   a threaded member threadedly received within the sleeve and extending parallel to the axis of the hubs; and
   a support projecting radially from one of the said hubs, said support journaling said threaded member and anchoring the same against axial movements whereby rotation of the threaded member will cause axial displacement of the sleeve to disengage the sleeve from the other of said hubs.

4. A coupling in accordance with claim 3 wherein said threaded member comprises an elongated screw having an unthreaded portion adjacent one end which is journaled in a bore in said support.

5. A coupling in accordance with claim 4 wherein said sleeve has an outwardly extending flange having a threaded bore that receives said screw, and wherein said screw has a head adapted to bear against the flange.

6. A coupling in accordance with claim 5 together with a circular cylindrical ring disposed about said one hub between said support and the external teeth of said one hub, said ring having an outer surface adapted to engage and support the inner diameter of the internal gear teeth of said sleeve when said sleeve is axially displaced.

* * * * *